Patented Oct. 6, 1942

2,298,138

UNITED STATES PATENT OFFICE 2,298,138

INORGANIC SUBSTITUTED ACETIC ACID

Donald J. Loder, Wilmington, Del., assignor to E. I. du Pont de Nemours & Company, Wilmington, Del., a corporation of Delaware No Drawing. Application April 9, 1938, Serial No. 201,180

7 Claims. (Cl. 260—539)

This invention relates to a process for the preparation of substituted acetic acids and more especially to the preparation of such acids by the interaction of formaldehyde and an inorganic acid with carbon monoxide.

An object of the present invention is to provide an improved process for the preparation of an inorganic-substituted acetic acid. Another object of the invention is to provide an economical process for the preparation of an inorganic-substituted acetic acid having the formula $CH_2X\ COOH$, in which X is the negative group of an inorganic acid. Yet another more specific object of the invention is to provide a process wherein formaldehyde and an inorganic acid are interacted with carbon monoxide. A further object is to provide catalysts for this synthesis. Other objects and advantages of the invention will hereinafter appear.

The above and other objects of the invention are realized by reacting carbon monoxide, formaldehyde, or one of its polymers, and an inorganic acid, preferably, in the presence of a catalyst having acidic characteristics, and subjecting the resulting mixture to heat and pressure whereupon a substituted acetic acid is obtained in accordance with the equation:

$$n(HCHO) + n(CO) + H_nX \rightarrow X(CH_2COOH)_n$$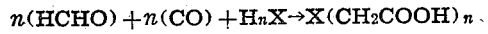

in which X is the anion of an inorganic acid and n is an integer. For example, when the anion of hydrochloric acid, hydrobromic acid, hydrofluoric acid, phosphoric acid, hydrogen sulfide, sulfuric or sulfurous acids, or boric acids is substituted for $H_nX$, chloracetic, bromoacetic, fluoroacetic, phosphoroacetic, mercaptoacetic acids, and sulfuric, sulfurous and boric esters of hydroxy acetic acids, respectively, are produced. In the above formula, if hydrochloric acid is substituted for $H_nX$ the formula reads:

$$HCHO + CO + HCl \rightarrow CH_2(Cl)COOH$$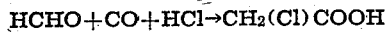

When polybasic acids are reacted one or more of the hydrogens thereof may be replaced by one or more oxyacetic acid groups, respectively.

Generally, no added catalysts are required to acelerate the reactions and particularly so when reaction is conducted with hydrochloric acid or a strong mineral acid, with a pH of more than 6, as the acid reactant. For the weaker acids, however, i. e., those having a pH of more than 6, it is often desirable to have an acidic type catalyst present, that is, one having, when dissolved in water, a strong hydrogen ion concentration, i. e., a pH of 6 or less, for it appears that for these reactions the stronger inorganic acids, namely, hydrochloric and sulfuric are exceptionally good catalysts to accelerate the interaction of carbon monoxide with formaldehyde and the weaker inorganic acids.

Catalysts, when employed, may be used in amounts ranging up to 1.0 mol thereof per mol of formaldehyde, but from 0.01 to 0.1 mol will give satisfactory results. It will usually be found that with increased catalyst amount the reaction will proceed at lower temperature and pressure, while with decreased catalyst amount a somewhat higher pressure and temperature are required to effect reaction at an equal rate.

The formaldehyde may be subjected to reaction in any convenient way or in any convenient form. Thus, formaldehyde may be dissolved in water to give an aqueous solution thereof containing up to approximately 60% formaldehyde; or (technical "formalin"), for instance, or solutions of polymeric formaldehyde, paraformaldehyde or trioxymethylene may be used. The anhydrous aldehyde in the form of its polymer, for example, is, in many instances, preferred, for by the use of aldehyde in this form excellent yields result.

The reaction of formaldehyde and water with carbon monoxide in the presence of catalytic quantities of a mineral acid such as hydrochloric acid (i. e., up to approximately 0.1 mol of hydrochloric acid per mol of formaldehyde) generally yields hydroxy acetic acid, exclusively, and the hydrochloric acid is recoverable unchanged. This is true only when the reaction takes place rapidly and when the product is cooled immediately after carbon monoxide absorption ceases. If, however, larger quantities of hydrochloric acid are used and if the reaction mixture is heated for some time after carbon monoxide absorption ceases, appreciable amounts of the hydrochloric acid, or other mineral acid used, are consumed to form the substituted-acetic acid. I have found that the formation of chloroacetic, as well as other substituted acetic acids, is favored by maintaining the acid concentration above 0.1 mol of acid per mol of formaldehyde, as well as by the use of substantially anhydrous conditions. Holding the temperature preferably above 120° C., and extending the heating period, also act independently to favor their formation.

The carbon monoxide required for the synthesis may conveniently be derived from various commercial sources as, for example, from water gas, producer gas, etc., by liquefaction or other methods and should, for best results, be relatively pure.

The reaction proceeds at ordinary pressures, although it is advantageous to use superatmospheric pressures, preferably of from 5 to 1500 atmospheres or more. The reaction, which is exothermic, may be effected over a wide range of temperatures, although the optimum temperature varies with specific conditions, depending, inter alia, upon the type of inorganic acid employed, the amount of catalyst, etc. Generally, the reaction is carried out at temperatures ranging from 50° C. to 350° C., although temperatures between 140 and 225° C. have been found preferable. Mild cooling means should generally be provided to maintain the temperature within the selected range.

The reaction product usually consists of a solution containing the substituted acetic acid, a small amount of formic acid, hydroxy acetic acid, unconverted formaldehyde, the catalyst, if one be used, and a small amount of water. The substituted acetic acid such, for example, as chloroacetic acid, may be readily separated from this crude mixture by distillation which is preferably carried out at from 80 to 100 mm. mercury pressure. Alternatively, after distillation of the greater portion of the free water, formic acid and unchanged formaldehyde, the residue, may be neutralized, e. g., with calcium carbonate, to convert the substituted acetic acid into a readily separable salt or the residue may be esterified with a suitable alcohol for removal of the esters by distillation. In some instances it may be preferable to recover the product from the concentrated solution by crystallization, after separation of the catalyst and removal of the excess water under reduced pressures.

The following examples will illustrate methods of practicing the invention, although it will be understood that the invention is not limited to the details therein given.

Example 1

A sulfuric acid derivative of acetic acid may be prepared by placing in an autoclave 1 mol of solid trioxymethylene and 1.0 mol of sulfuric acid. A carbon monoxide atmosphere is superimposed upon the resulting liquid and its pressure increased to approximately 900 atmospheres. The autoclave and contents are heated up to a temperature of 164° C. and held at temperature until the desired product is obtained. The sulfuric acid derivative may be separated from the product.

Example 2

The process of Example 1 may be repeated using a mixture containing 1 mol of formaldehyde and 1 mol of hydrochloric acid. The reaction is conducted in the presence of excess carbon monoxide at a temperature of approximately 180° C., at a pressure between 800 and 900 atmospheres and for a period of 48 minutes. The product, on analysis, gives approximately a 39% yield of chloroacetic acid.

Example 3

The phosphoric esters of hydroxy acetic acid are obtained by repeating the process of Example 1 using a mixture containing 1 mol of formaldehyde and 2 mols of phosphoric acid. The reaction is conducted in the presence of excess carbon monoxide at a temperature between 100° C. and 225° C., at a pressure between 800 and 900 atmospheres, the temperature being held for approximately 60 minutes.

Example 4

The process of Example 1 may be repeated, for the preparation of fluoroacetic acid, by using a mixture of 1 mol of formaldehyde and 1 mol of hydrochloric acid. The reaction is conducted in the presence of an excess of carbon monoxide at a temperature of approximately 160° C., at a pressure of approximately 750 atmospheres and for a period of about 60 minutes.

It is to be understood that applicant contemplates the preparation of substituted-acetic acids obtained by the reaction of carbon monoxide with the reaction products of formaldehyde with the inorganic acid reacted, as well as from the reaction of carbon monoxide with the separate reactants, i. e., the formaldehyde and the inorganic acid. The interaction of the formaldehyde with the inorganic acid, in accord with this concept of the invention, may be carried out prior to or subsequent to contact with the carbon monoxide.

While the examples have referred particularly to carrying out the process in a more or less discontinuous manner, the process of the invention may likewise be effected in a continuous manner, for example, by passing formaldehyde, inorganic acid and catalyst through a reaction zone either co-current or counter-current to the flow of carbon monoxide, the rates of flow being adjusted to yield the desired degree of reaction. The carbon monoxide should be maintained, as in the processes described in the examples, at a suitable pressure and the temperature of the continuous reaction should be held within the prescribed range by suitable heating means.

In order to insure adequate intimate contact between the reactants, thorough stirring is essential to high yields when conducting the process in an autoclave, and no matter what the type of reaction vessel used may be, intimate contact is also of considerable importance if optimum results are desired.

Because of the corrosive nature of the catalyst and reactants, it is advisable to carry out the process of the invention in glass, silica, porcelain or glass-lined vessels or the inner surface of the reaction vessel which contact with the reactants should be constructed of such corrosion-resistant metals as silver, chromium, stainless steel and the like.

When formaldehyde is referred to in the appended claims it will be understood that paraformaldehyde, trioxymethylene, or any polymeric or monomeric form of formaldehyde, is included.

From a consideration of the above specification it will be appreciated that many changes may be made in the details, conditions and reactants given without in any way departing from the invention or sacrificing any of the advantages which may be derived therefrom.

I claim:

1. A process of producing chloracetic acid which comprises reacting formaldehyde and carbon monoxide under substantially anhydrous conditions with at least 0.1 mole of hydrochloric acid per mole of formaldehyde at a temperature between 50 and 350° C. and at a pressure of at least 5 atmospheres.

2. A process for the preparation of chloracetic acid which comprises heating a substantially equimolecular mixture of formaldehyde and hydrochloric acid under substantially anhydrous conditions in the presence of an excess of carbon monoxide.

3. A process for the preparation of chloracetic acid which comprises reacting approximately 1 mole of formaldehyde and approximately 1 mole of hydrochloric acid with an excess of carbon monoxide at a temperature of approximately 180° C. and a pressure between 800 and 900 atmospheres for approximately 48 minutes.

4. A process of producing an inorganic acid-substituted acetic acid which comprises heating formaldehyde, an inorganic acid, and carbon monoxide and thereby effecting a reaction in accord with the equation:

$$n(HCHO) + n(CO) + H_nX = X(CH_2COOH)_n$$

in which X is the anion of an acid selected from the group consisting of hydrochloric acid, hydrobromic acid, hydrofluoric acid, phosphoric acid, and sulfuric acid and $n$ is an integer, there being present reaction quantities of the inorganic acid.

5. A process of producing an inorganic acid-substituted acetic acid which comprises reacting formaldehyde and carbon monoxide under substantially anhydrous conditions with per mole of formaldehyde at least 0.1 mole of an inorganic acid selected from the group consisting of hydrochloric acid, hydrobromic acid, hydrofluoric acid, phosphoric acid and sulfuric acid, at a temperature between 50 and 350° C. and at a pressure in excess of 5 atmospheres.

6. A process of producing halogen-substituted acetic acids which comprises heating formaldehyde, a halogen acid and carbon monoxide in the substantial absence of water.

7. A process of producing halogen-substituted acetic acids which comprises reacting formaldehyde, a halogen acid and carbon monoxide in the substantial absence of water at a temperature between 50 and 350° C. and at a pressure of at least 5 atmospheres.

DONALD J. LODER.